May 5, 1953  W. H. SILVER ET AL  2,637,258
DISK PLOW AND STEERING MECHANISM THEREFOR
Filed June 7, 1947  5 Sheets-Sheet 1
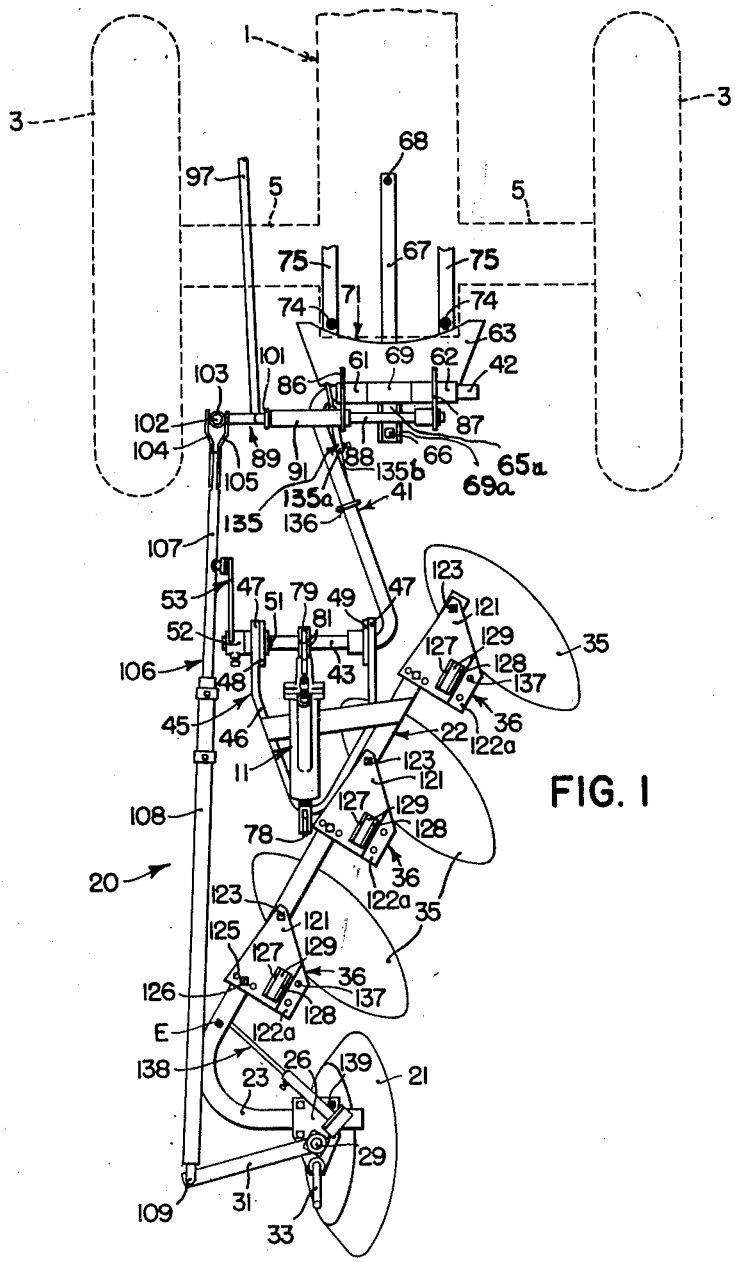
FIG. I
INVENTORS
WALTER H. SILVER, ROBERT E. COX
BY
ATTORNEYS

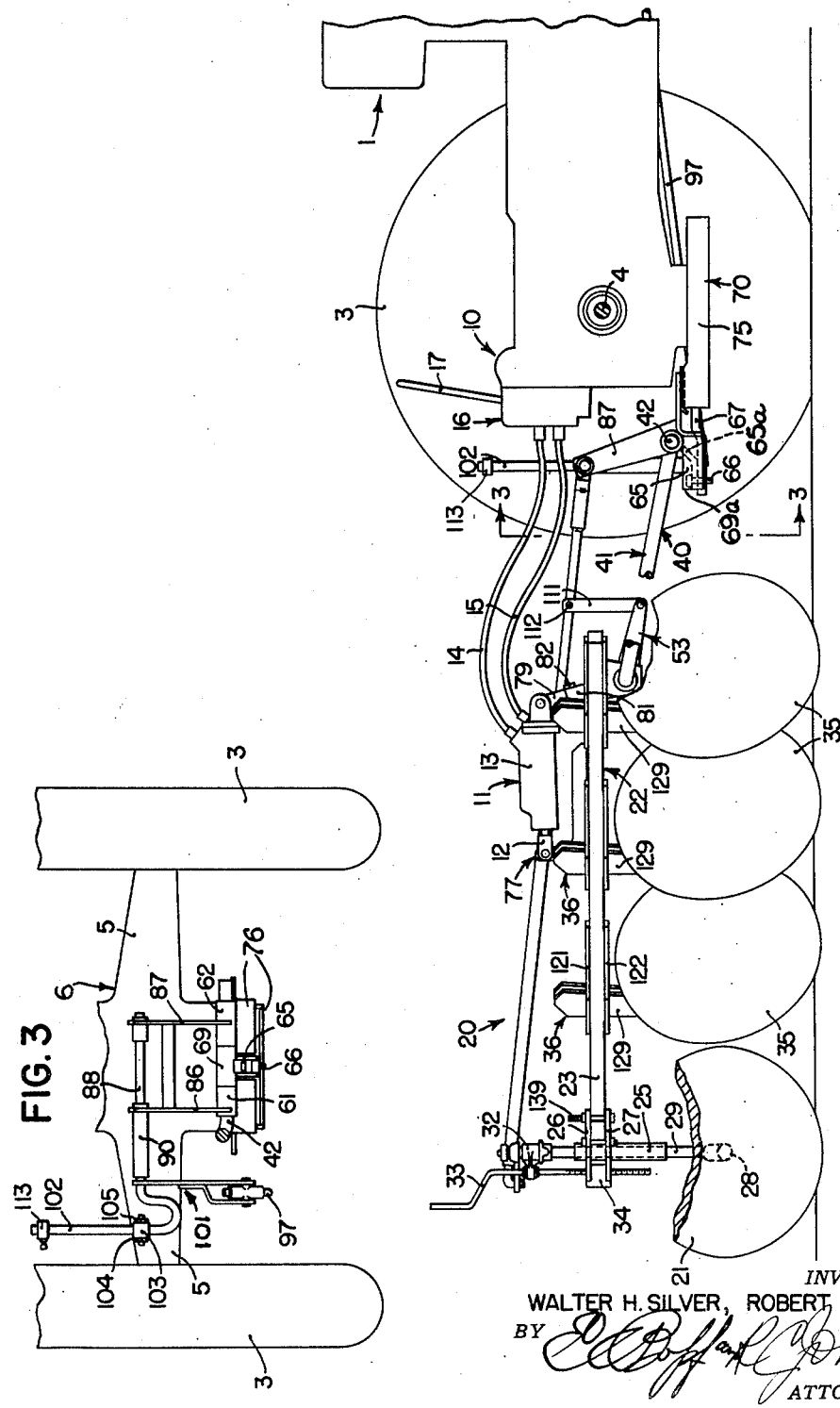

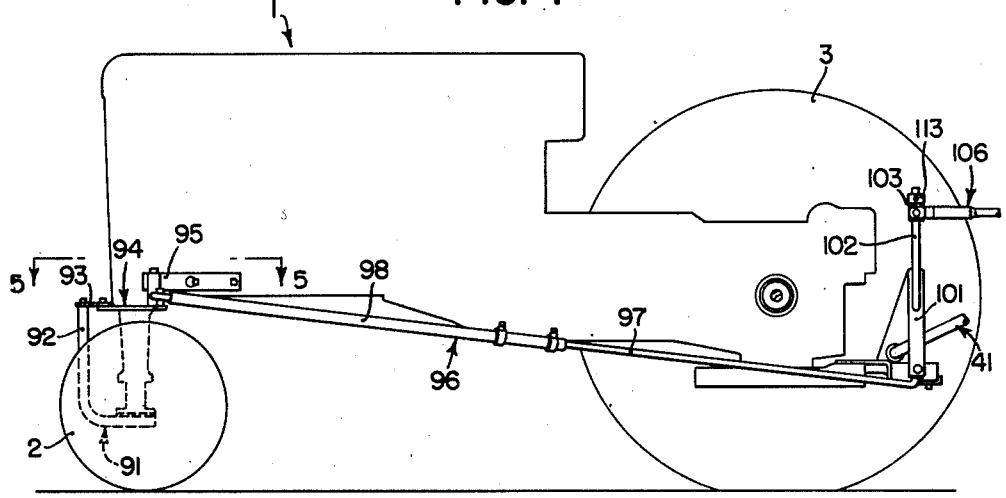
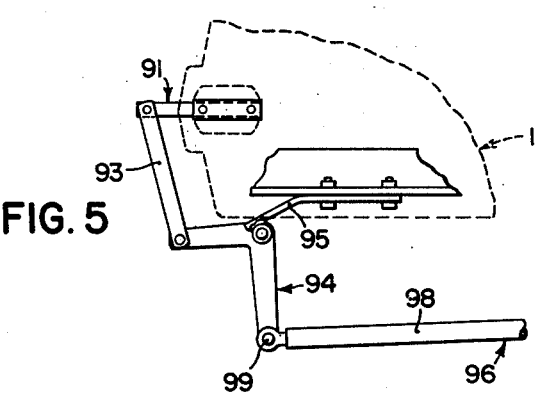
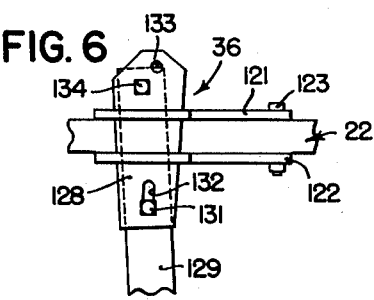
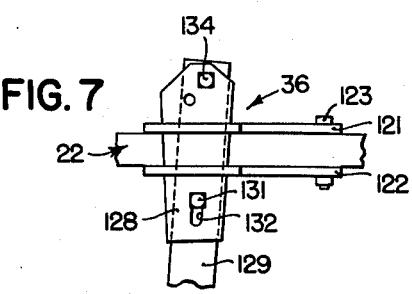

May 5, 1953  W. H. SILVER ET AL  2,637,258
DISK PLOW AND STEERING MECHANISM THEREFOR
Filed June 7, 1947  5 Sheets-Sheet 4

INVENTORS
WALTER H. SILVER, ROBERT E. COX
BY
ATTORNEYS

May 5, 1953          W. H. SILVER ET AL          2,637,258
            DISK PLOW AND STEERING MECHANISM THEREFOR
Filed June 7, 1947                              5 Sheets-Sheet 5

*INVENTORS*
WALTER H. SILVER, ROBERT E. COX
BY
*ATTORNEYS*

Patented May 5, 1953

2,637,258

UNITED STATES PATENT OFFICE 2,637,258

DISK PLOW AND STEERING MECHANISM THEREFOR

Walter H. Silver and Robert E. Cox, Moline, Ill., assignors to Deere & Company, Moline, Ill., a corporation of Illinois Application June 7, 1947, Serial No. 753,174

16 Claims. (Cl. 97—46.27)

The present invention relates generally to tractor mounted implements and is more particularly concerned with ground working tools, such as plows and the like, of the semi-integral type.

The object and general nature of the present invention is the provision of a semi-integral implement, such as a disk plow, particularly arranged and constructed for quick and easy connection with the tractor and for quick and easy disconnection therefrom, in conjunction with new and improved steering means between the front steerable means of the tractor and the rear steerable wheel of the implement. More particularly, it is a feature of this invention to provide an arrangement wherein the rear steerable wheel of the implement is held against steering movement when the outfit is in operating position but is arranged to be steered from the steerable front wheel means of the tractor when the implement is raised into its transport position, and a further feature of this invention is to provide means responsive to or acting concomitantly with the raising and lowering means for changing the steering connection from a position holding the rear steerable wheel against movement into a position providing for its steering movement by the movement of the steerable front wheel means of the tractor.

Another feature of this invention is the provision of a semi-integral implement of the towed type in which the implement is capable of relative free lateral swinging movement relative to the tractor and in which the rear steerable wheel of the implement is controlled in different lateral positions of the implement by a connection with the steerable front wheel means of the tractor, the connections being such that the steering action imparted to the rear steerable wheel is substantially unaffected by changes in the lateral position of the implement relative to the tractor.

Another feature of the present invention is the provision of improved means for raising and lowering the implement, preferably in the form of a hydraulic cylinder unit acting between the implement frame and a hitch member that is hingedly connected with the implement frame and with the tractor.

These and other objects and advantages of the present invention will be apparent to those skilled in the art after a consideration of the following detailed description, taken in conjunction with the accompanying drawings, in which:

Figure 1 is a plan view of a semi-integral disk plow in which the principles of the present invention have been incorporated.

Figure 2 is a side view of the implement shown in Figure 1.

Figure 3 is a sectional view taken generally along the line 3—3 of Figure 2.

Figures 4 and 4a are fragmentary views illustrating the steering connections extending between the front steerable wheels of the tractor and the steering link of the implement.

Figure 5 is a fragmentary enlarged plan view of a portion of the steering linkage shown in Figure 4, corresponding generally to a view taken along the line 5—5 of Figure 4.

Figures 6 and 7 are fragmentary views illustrating the optional positions of the disk furrow opener standards.

Figure 8:
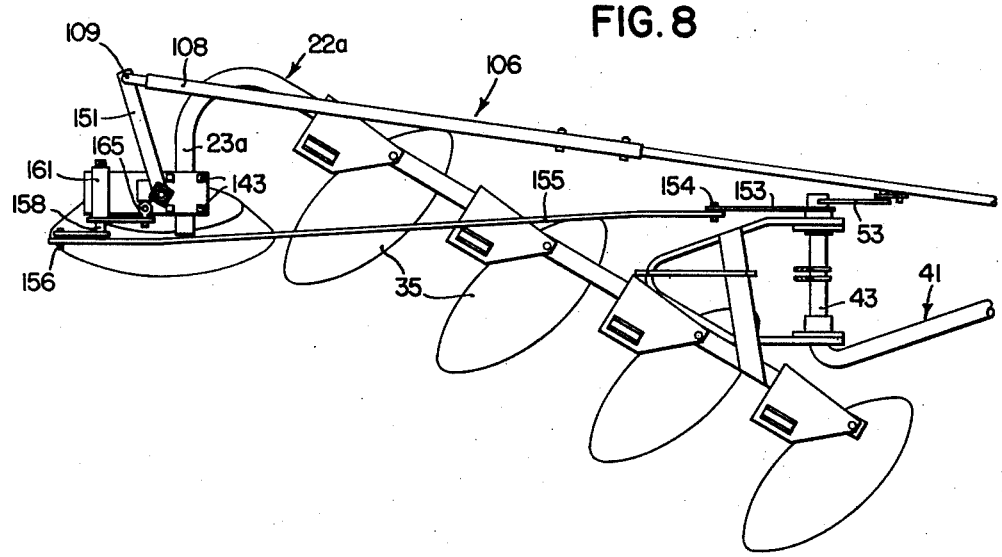
Figures 8 and 9 are fragmentary plan and elevational views of a modified form of the present invention wherein means is provided for raising and lowering the rear end of the frame relative to the rear furrow wheel.

Referring now more particularly to Figures 1 and 2, the tractor is indicated in its entirety by the reference numeral 1 and includes a pair of closely spaced steerable front wheels 2 and a pair of widely spaced rear traction wheels 3 mounted on axle shafts 4 that are carried in extensions 5 forming a part of the rear axle structure 6 of the tractor. The tractor 1 is provided with a power lift unit indicated in its entirety by the reference numeral 10 and which includes a hydraulic cylinder unit 11, including a piston and piston rod 12 movable in a cylinder 13 that is connected by hose lines 14 and 15 with a controlling valve unit 16 the operating handle of which is indicated at 17. The present invention is not particularly concerned with the details per se of the power lift unit, the same being substantially like that shown in U. S. Patent 2,532,552, issued December 5, 1950, to Jirsa et al. Normally, the cylinder unit 12, 13 is attached to the tractor as a permanent part thereof. The implement in which the principles of the present invention have been incorporated, and shown in the accompanying drawings by way of illustration, is indicated in its entirety by the reference numeral 20 and comprises a semi-integral disk plow having its front end supported on a tractor and its rear end supported on a rear furrow wheel 21. The plow 20 includes a generally longitudinally extending beam structure 22, the rear end portion 23 of which is bent laterally and forms a section receiving a rear furrow wheel spindle sleeve 25, which is fixed to the beam 22 by upper and lower clamping plates 26 and 27. The rear furrow wheel 21 is mounted on a furrow wheel axle 28 the spindle section 29 of which is disposed for both turning and vertical movements in the sleeve section 25. A steering arm 31 is fixed to the upper end of the spindle 29, and the latter also carries a rotatably mounted collar 32 that is connected by an adjusting crank screw 33 with a nut member 34 carried between the rear portions of the upper and lower plate brackets 26 and 27. The lower end of the crank member 33 is screw threaded, and turning the crank 33 in one direction or the other serves to raise or lower the end of the beam 22 relative to the rear furrow wheel 21.

The plow beam 22 carries a plurality of furrow openers 35, preferably in the form of rotatable disks 35 connected by suitable brackets 36 to the beam 22. The lateral position of the rear furrow wheel 21 may be changed by loosening the bolts clamping the plates 26 and 27 to the rear end of the beam 22, shifting them to the desired location, and then tightening the bolts for securing the rear wheel mounting firmly to the plow beam in its new location.

The plow frame means 22 is connected with the tractor 1 for generally lateral swinging and also for movement about generally transverse axes in a generally vertical direction. The hitch construction connecting the plow frame with the tractor will now be described.

The hitch construction is indicated in its entirety by the reference numeral 40 and comprises a generally Z-shaped draft member 41, preferably formed of heavy bar stock with front and rear sections 42 and 43 directed generally laterally in opposite directions. A rear bracket construction 45 comprising a generally U-shaped member 46 is fixed to the intermediate portion of the beam or bar 22 and has laterally spaced forward ends 47 apertured to receive the rear section 43 of the draft member 41. Vertical bearing plates 48 and 49 are fixed to the forward ends 47 of the bracket 46, and the plates 48 and 49 are apertured to receive the section 43 of the draft member 41. The draft member 41 is held against lateral displacement in the bracket 45 by any suitable means, such as a pin 51 disposed on one side of the associated apertured bracket plate 48 and by the hub section 52 of a steering control arm 53 that is fixed to the outer end portion of the draft bar section 43. The draft member 41, with associated parts, forms means connecting the forward end of the plow beam or frame 22 with the tractor 1 for generally vertical movement relative thereto.

The forward laterally turned end portion 42 of the draft member 41 is received in a pair of sleeve sections 61 and 62 that are secured, as by welding, to a mounting plate 63. Swingably mounted on the forward portion 42 of the draft member 41, between the sleeve sections 61 and 62, is a yoke 65 that is provided with a rearwardly extending section 65a apertured at its rear end to receive a detachable pivot bolt 66 by which the yoke 65 may be connected to the rear end of the laterally swingable drawbar 67 of the tractor 1. The drawbar 67 is pivotally connected, as at 68, at its forward end to the tractor and is carried in a drawbar support 70 mounted on the lower portion of the rear axle of the tractor. The yoke 65, in addition to the section 65a, also includes a central sleeve 69 (Figure 1) mounted on the forward section 42 of the hitch member 41 and a pair of side plates 69a between which the tractor drawbar 67 is adapted to be disposed. The forward edge of the mounting plate 63 is arcuately formed, as shown at 71 (Figure 1), and is adapted to bear against rollers or guide studs 74 carried by the tractor drawbar support 70. The tractor drawbar support 70 is of conventional construction and, in general, comprises a pair of side angles 75 and upper and lower rear crossbars 76, as best shown in Figures 1 and 3. Thus, the implement 20 is adapted to swing laterally relative to the tractor about the pivot point 68 and is also adapted to swing vertically about the transverse axes provided by the drawbar sections 42 and 43.

A cylinder-receiving bracket 77 is carried by the frame bar 22, and the power lift cylinder unit 12, 13 of the tractor is connected between the rear upturned end 78 of the bracket 77 and an arm 79 that is connected with the rear section 43 of the drawbar 41. Preferably, the arm 79 is rockably mounted between a pair of arms 81 secured, as by welding, to the drawbar section 43, the arm 79 being engageable with a stop 82 carried by the short arms 81, whereby when the cylinder unit 12, 13 is extended the drawbar 41 is swung upwardly in a generally clockwise direction (Figure 2), which raises the plow frame and the disks 22 upwardly into a transport position. The plow is lowered into operating position by manipulation of the valve handle 17 so as to permit the cylinder unit 12, 13 to retract, thus lowering the front end of the implement frame 23. A pair of standards 86 and 87 are fixed to the sleeves 61 and 62, as by welding, and are provided with bearing sections rockably supporting the shaft 88 of a steering lever member 89, the left end of the shaft 88 being supported in a sleeve section 90 that is welded to the standard 86. The steering arm 31 and the lever member 89 form a part of an adjustable steering connection between the steerable front wheel means 2 of the tractor and the implement rear steerable wheel 21. An arm 91 is fixed to turn with the steerable front wheel means of the tractor and includes an upwardly directed section 92 that is connected by a link 93 with a bell crank 94 that is mounted for rocking movement on a bracket 95 fixed to the front end of the tractor. A longitudinally extending link 96, preferably formed of two relatively adjustable telescoping sections 97 and 98, is pivotally connected at its front end, as at 99, to the bell crank 94, and at its rear end the link section 97 is pivotally connected to the lower end of an arm 101 that is fixed to the shaft 88. The latter carries a second arm 102, which extends generally vertically upwardly and slidably receives a swivel member 103 to which the attachment arms 104 and 105 of a rear link 106 are pivotally connected. The rear link 106 is made up of two telescopically associated sections 107 and 108, the latter section being pivotally connected, as at 109, to the rear wheel steering arm 31. The slidable sleeve section 103 is shiftable along the arm 102 from one position adjacent the outer end thereof downwardly into a position substantially in line with the axis defined by the shaft 88, and such shifting of the link 106 is effected by virtue of a connection with the generally vertically swingable drawbar 41. The last mentioned connection or link-shifting means is effected by means of a link 111 that is pivotally connected to a stud 112 carried by the front link section 107, the lower end of the link 111 being pivoted to the forward end of the steering arm 53 that is fixed to the rear section 43 of the drawbar. The arm 102 and the sleeve 103 and link 106 constitute relatively movable parts whose relative position is controlled by movement of the drawbar 41, and the link 111, which serves as means for shifting the link 106 and the sleeve 103 relative to the arm 102, is connected with the implement frame through the steering control arm 53, the drawbar section 43 and the bracket member 46. A stop in the form of a set screw collar 113 or the like is fixed to the upper end of the arm 102 to limit the upward movement of the slide 103, especially when the arm 102 is in an angled position.

The disk supporting bracket 36 and associated parts are of particular construction and will now be described. The bracket 36 is made up of upper and lower plates 121 and 122 apertured to receive a forward bolt 123 that connects the front portion of the bracket plates 121 and 122 to the beam 22. The rear portions of the bracket plates 121 and 122 are apertured, as at 125, to receive a rear bolt 126. The latter bolt may be disposed in selected pairs of openings 125 so as to dispose the bracket 36 in different angular positions on the beam 22. The bracket plates 121 and 122, which are of generally triangular construction are provided with laterally outwardly disposed openings to which a pair of vertical plates 127 and 128 are fixed, preferably by welding or the like, with a space therebetween so as to receive a vertical standard 129, on the lower end of which the disk 35 is mounted by any suitable bearing means. The standard 129 carries a lower bolt 131 which passes through slots 132 formed in the lower end of the vertical plates 127 and 128, and the upper ends of the latter plates are provided with a pair of offset apertures 133 to receive an upper bolt 134 which passes through an opening in the upper end of the disk standard 129. The bolt 134 may be disposed in either the lower pair or the upper pair of openings 133, the lower bolt 131 sliding in the slots 132 to accommodate the necessary change in the angular and vertical position of the standard 129. In this way, the disk standards 129 may be adjusted for different sizes of disks and different angles of cut.

Each of the lower bracket plates 122 is extended laterally outwardly, as at 122a, and is apertured laterally outwardly of the vertical plates 127 and 128, as at 137, to receive a novel form of scraper mounting described in detail below.

The operation of the implement described above is substantially as follows. When the implement is in operating position the parts are arranged substantially as shown in Figure 2, the lowering of the rear portion of the drawbar 41 acting through the arm 53 and the link 111 to shift the front end of the link 106 downwardly so as to bring the sleeve section 103 substantially in line with the axis of the shaft 88, thereby holding the rear furrow wheel 21 against turning movement about its vertical axis. The depth of operation is controlled by extending or retracting the hydraulic unit 12, 13 through suitable operation of the valve handle 17, and the same hydraulic unit may be operated to raise the implement into a transport position. In this position, the cylinder unit 12, 13 is extended substantially the full amount, reacting against the bracket 77 to swing the rear end of the drawbar 41 upwardly and forwardly, not only raising the implement frame into a transport position but also raising the slidable part 103 of the steering linkage substantially to the upper end of the arm 102. During transport, the cylinder 12, 13 serves to hold the parts in this position, and therefore turning of the tractor steerable front wheel means acts through the linkage 86, 106 and associated parts to steer the rear furrow wheel 21 so as to cause the plow to follow the tractor, whether going forward or backing up, and both in transport and operating positions, the plow is free to swing laterally relative to the tractor about the pivot point 68.

For holding the plow parts in position when detached from the tractor we provide a pair of stands swingable into and out of supporting and working position. The forward stand 135 comprises a pair of adjustably connected parts 135a and 135b and is swingably mounted on the end 42 of the draft member 41. The stand has a hook section 136 for holding the stand out of contact with the ground when working. The rear stand 138 comprises a pair of adjustably connected parts and is swingably connected by an eyebolt E or the like to the rear end of the frame bar 22 and in the working position is held on the upper clamping plate 26 by an elongated bolt 139.

Figure 9:
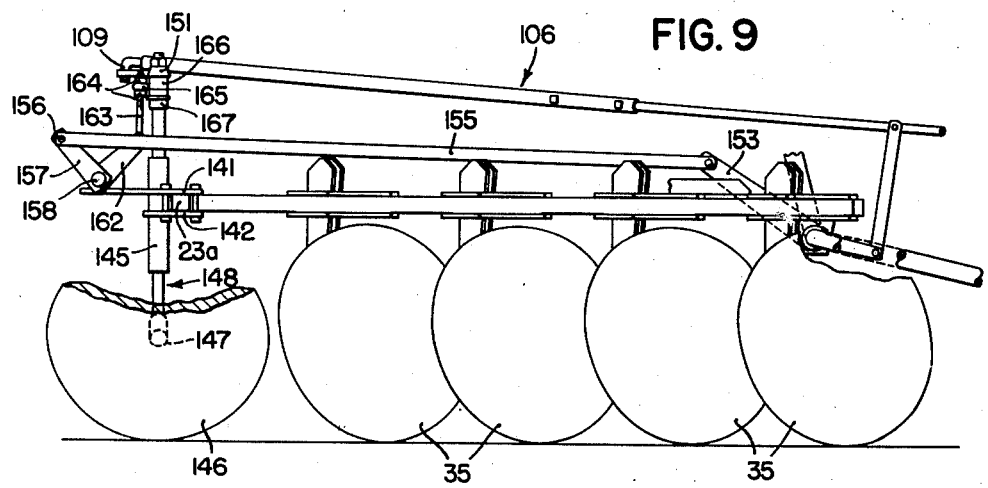

Figures 8 and 9 show a modified form of the present invention wherein means is provided for raising and lowering the rear end of the frame relative to the rear furrow wheel. While no means is shown in the form of the invention shown in Figures 1–7 for raising and lowering the frame relative to the rear furrow wheel 41, since generally it is not necessary to raise the rear end of the frame where only three furrow openers are used, it may be desirable to provide rear raising means when more than three furrow openers are used. Referring now to Figures 8 and 9 it will be noted that the construction of the various parts is substantially the same as described above except that the frame bar or beam 22a is longer than the beam 22 shown in Figure 1 so as to provide for four furrow opener disks 35. A rear portion of the plow beam 22a is extended laterally, as at 23a, and receives upper and lower clamping plates 141 and 142 which are adjustably secured to the rear portion of the beam 22a by bolts 143. The upper plate 141 receives a vertical sleeve 145, which may be substantially identical with the sleeve section 25 described above, and a rear furrow wheel 146 is journaled on the lower portion 147 of a rear furrow wheel spindle 148, which extends upwardly through the sleeve section 145 and carries an arm 151. Preferably, the steering linkage 106, described above, is extended so as to accommodate the longer frame 22a and the rear section 108 thereof is pivotally connected by a pivot section 109 to the outer end of the arm 151.

The rear section 43 of the Z-shaped draft member 41 is, in this form of the invention, provided with an upwardly and rearwardly extending arm 153 which is apertured to receive a pivot pin 154 by which the forward portion of the rearwardly extending link 155 is connected to the arm 153. The rear end of the link 155 is provided at 156 to an arm 157 that is fixed to a stub shaft 158. The latter member is mounted for rocking movement in a bearing sleeve 161 carried on the rear portion of the upper clamping plate 141, being preferably secured thereto by welding or the like. A second arm 162 is fixed to the stub shaft 158 and is pivoted to receive the lower end of a threaded link 163, the upper threaded end of which is adjustably connected by a pair of lock nuts 164 to a swivel member 165 carried in a cap member 166. The latter member is confined between the inner end of the arm 151 and a set screw collar 167 on the upper end of the spindle 148.

In operation, whenever the hitch member 41 is raised, in the manner described in connection with the form of the invention shown in Figures 1 et seq., the arm 153 swings forwardly and exerts a pull through the link 155 to swing the bell crank member 157, 158, 162 in a clockwise direction (Figure 9) and serves to raise the rear end of the frame relative to the rear furrow wheel 146. It will be understood, of course, that the plow shown in Figures 1 et seq., even though three furrow openers are used, may be provided with a rear lifting linkage like the one just described.

Figure 10:
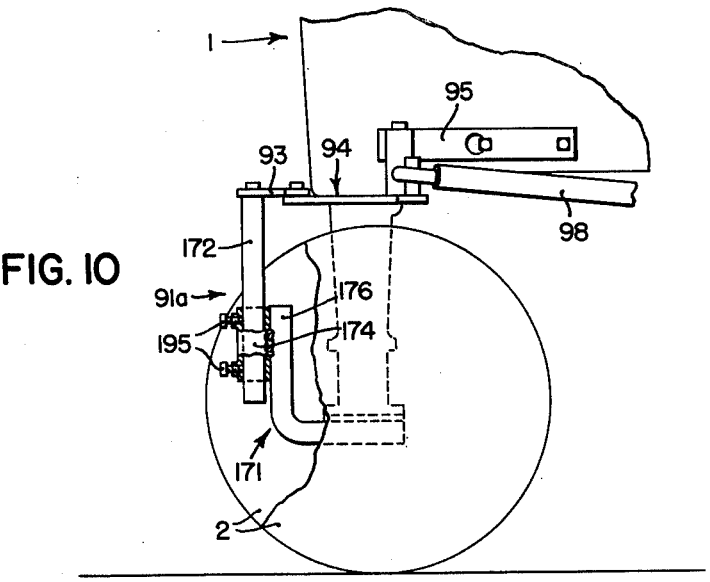
Figure 10 shows a modified form of steering arm.

A modified form of steering arm is shown in Figure 10. The construction is quite similar to that shown in Figure 4 except that the tractor carried steering arm 91a (Figure 10) is made up of two parts 171 and 172, the former being fixed to turn with the front wheel means of the tractor and the other receiving the link 93, connected together for vertical adjustment by a sleeve 174 welded to the upper end 176 of bar 171 and having a pair of set screws 195 for clamping the lower end of the bar 172 against the upper end of the lower bar 171. Thus, the steering arm 91a may be adjusted to fit various sizes and/or kinds of tractors.

Figure 11:
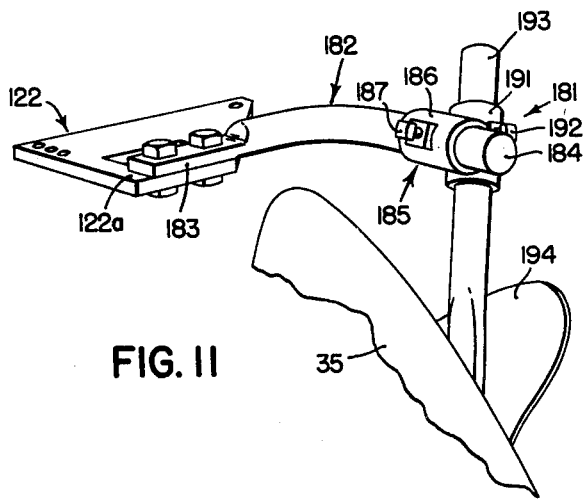
Figure 11 shows a novel form of scraper mounting.

The improved form of scraper mounting or support, applicable to the form of the invention shown in Figures 1 et seq., but omitted from those figures for purposes of clarity, is best shown in Figure 11. A scraper bracket 181 is provided for each furrow opener 35 and includes an L-shaped bar 182 flattened at one end, as at 183, and apertured to receive the bolts that secure it to the associated bracket plate 122. The bar 182 is formed preferably of round stock and has its other end 184 extending generally laterally outwardly to receive a T-casting 185. The latter member has a first sleeve section 186 receiving the bar end 184 and is held in place by a set screw 187. The second sleeve section 191 of the member 185 lies generally vertically and carries a set screw 192 for clamping the upper end of the shank 193 of the scraper 194 therein. By loosening the set screws the scraper may be shifted inwardly or outwardly along the bar end 184 and/or swung in a generally fore and aft direction toward or away from the associated disk 35. Also, the scraper may be turned into different positions about the generally vertical axis defined by the vertical sleeve section 191.

While we have shown and described above the preferred structure in which the principles of the present invention have been incorporated, it is to be understood that our invention is not to be limited to the exact details shown and described above, but that, in fact, widely different means may be employed in the practice of the broader aspects of our invention.

What we claim, therefore, and desire to secure by Letters Patent is:

1. An integral implement adapted to be connected with a tractor having steerable front wheel means, comprising frame means, a rear steerable wheel supporting the rear portion of said frame means, means acting between the tractor and front portion of said frame means for raising and lowering the latter, means for steering said rear wheel from the tractor steerable front wheel means when said frame means is raised, said means including a first part swingable about an axis in response to steering movement of said front wheel means and a second part carried by said first part for movement thereon toward and away from said axis and operatively connected with said rear wheel, and means connected with said frame means to be moved by lowering movement of the latter for shifting said second part on said first part substantially to said axis for holding said rear wheel against steering movement when said frame means is lowered.

2. An implement as set forth in claim 1, further characterized by said raising and lowering means including a draft member pivotally connected with said frame means for generally vertical swinging movement, and pivot means connecting said draft member with the tractor for generally lateral swinging movement relative thereto.

3. An implement as defined in claim 2, further characterized by an arm fixed to said draft member, and a hydraulic cylinder unit connected between said frame means and said arm for swinging said draft member to raise and lower said frame means.

4. The combination with a tractor having a rear axle structure and front steerable wheel means, of an implement having a rear steerable wheel, a draft member pivotally connected with the front portion of said implement and the rear axle structure of said tractor for movement about generally transverse axes, an adjustable steering connection between the front steering wheel means of the tractor and the rear steerable wheel of the implement, said connection including relatively movable parts shiftable one relative to the other for controlling the amount of turning of the rear steering wheel resulting from a given amount of turning of said front steering wheel means, means connecting said one shiftable part with said draft member, and means for raising and lowering the latter for raising and lowering the front end of said implement frame and shifting said steering connection.

5. A semi-integral implement adapted to be attached to a tractor having front steering wheel means, said implement comprising frame means, means connecting the forward end of said frame means with the rear portion of the tractor for generally vertical movement relative thereto, a rear steerable wheel supporting the rear end of said frame means, a steering connection between said rear wheel and said tractor front wheel means, said steering connection including means movable into one position for transmitting motion from said tractor front wheel means to said rear steerable means and movable into another position so that no steering motion is transmitted from said front wheel means to said rear steerable wheel, and means connected with the front portion of said implement frame for shifting said movable means into said one position when said implement frame is raised.

6. A semi-integral implement adapted to be attached to a tractor having front steering wheel means, said implement comprising frame means, means connecting the forward end of said frame means with the rear portion of the tractor for generally vertical movement relative thereto, a rear steerable wheel supporting the rear end of said frame means, a lever member adapted to be mounted on the tractor for swinging movement about a generally transverse axis and including a pair of arms, a connection between one of said arms and said tractor front wheel means whereby steering movement of the latter serves to swing said lever member, a connection between said rear wheel and the other of said arms and including a part shiftable along said other arm between a first position adjacent said axis to a second position adjacent the outer end of said other arm, and means connected with the front portion of said implement frame and said shiftable part for shifting the latter from one of its positions on said other arm to the other of its positions when said implement is raised or lowered relative to the tractor.

7. An implement adapted to be connected with a tractor having steerable front wheel means, comprising frame means, generally vertically shiftable hitch means connecting the implement with the tractor, a rear steerable wheel supporting the rear portion of said frame means, a connection between said tractor steerable front wheel means and said implement rear steerable wheel for operating the latter from said tractor front wheel means, said connection including a shaft, an arm on the shaft connected with said tractor steerable front wheel means, a second arm on said shaft, a link connected at one end with said rear steerable wheel to steer the latter, and means shiftably connecting the other end of said link with said second arm, means for shifting said hitch means generally vertically to raise and lower the implement frame, and means connected with said hitch means and operated concomitantly therewith for shifting said link relative to said second arm when the implement frame is raised and lowered.

8. An implement adapted to be attached to a tractor having front steerable wheel means, said implement comprising frame means, a rear steerable wheel supporting the rear end of said frame means, a hitch connecting the front end of said frame means with said tractor including a part connected with the tractor in laterally swingable relation and a member connecting the rear portion of said part with the forward portion of said implement and hingedly connected with said implement and said part for generally vertical movement relative thereto about transverse axes, a shaft carried by said hitch adjacent one of said transverse axes, a pair of arms on said shaft, a first link means connecting the front steering wheel means of the tractor with one of said arms, and a second link means connecting the other of said arms with said implement rear steerable wheel, said shaft being shiftable generally laterally with said hitch relative to the tractor whereby lateral movement of the implement relative to the tractor causes only a slight variation in the effective length of the steering connection between the tractor front steering wheel means and the rear steerable wheel of the implement and the disposition of said shaft adjacent said one transverse axis providing for vertical swinging of the implement relative to the tractor without adversely affecting the steering connection between the tractor front steering wheel means and the implement rear steerable wheel.

9. The invention set forth in claim 8, further characterized by means for raising and lowering said vertically swingable hitch member, said last-mentioned link being shiftable at its forward end along the associated arm, and a connection between said last mentioned link and said vertically swingable hitch member for shifting said link along said arm when said hitch member is shifted generally vertically by said raising and lowering means.

10. A semi-integral implement adapted to be mounted on a tractor having front steerable wheel means, said implement comprising frame means, a draft member hingedly connected at its rear portion to said frame means, a laterally swingable hitch part connected with the rear portion of the tractor for generally lateral swinging movement and hingedly receiving the front portion of said draft member, a rear furrow wheel carried at the rear end of said frame and turnable about a generally vertical axis, a steering arm connected with said wheel for steering the same, a steering link connected with said steering arm, a transversely arranged shaft carried by said laterally swingable hitch part and carrying arm means, means slidably connecting the forward end of said steering link with said arm means, means acting between said implement and said hingedly connected draft member for raising and lowering said implement frame, and a connection between said draft member and said vertically shiftable steering link for raising or lowering the latter along said arm means, and a forwardly extending steering link connecting said arm means with the tractor front steerable wheel means.

11. A semi-integral implement adapted to be mounted on a tractor having front steerable wheel means, said implement comprising a generally longitudinally extending beam, a draft member hingedly connected at its rear portion to said beam and at its forward portion to the tractor, an arm on said draft member, means acting between said implement beam and said arm for swinging said draft member generally vertically to raise the lower said beam, a rear steerable wheel supporting the rear end of said beam, a steering connection between said wheel and said tractor including a part shiftable between one position, in which said steering connection is effective to steer said rear steerable wheel, and another position in which said steering connection is ineffective, and means connecting the shiftable part of said steering connection with said draft member whereby generally vertically swinging movement of said latter member serves to shift said shiftable part from one of its positions to the other.

12. An integral implement adapted to be connected with a tractor having a steerable front wheel means, comprising frame means, a rear steerable wheel supporting the rear portion of said frame means, means acting between the frame means and the tractor for raising and lowering said frame means into and out of transport and working positions, a steering connection associated with said tractor steerable front wheel means and including an arm swingably mounted on the tractor and movable in a generally fore and aft direction about a transverse axis, and a connection between said arm and said rear steerable wheel including a part shiftable on said arm from a point closely adjacent the axis of swinging thereof to a point adjacent the outer end of said arm, and means connected between said shiftable part and the implement frame means for shifting said part from the outer end of said arm to a point adjacent said axis when said implement is lowered into working position, so as to hold said rear wheel against steering, and for shifting said part from a position adjacent said axis to the outer portion of said arm when said implement is raised so as to provide for steering of said rear wheel by the movement of said tractor steerable front wheel means when said implement is raised into its transport position.

13. In a towed implement adapted to be connected with a tractor having steerable front wheel means and in which the implement is provided with a rear steerable wheel, the combination of means for raising and lowering said implement, a connection between said rear steerable wheel and said steerable front wheel means and including means movable from one position in which steering motion is transmitted from said steerable front wheel means to said rear steerable wheel to another position in which said rear wheel is held against steering movement when said steerable front wheel means is actuated, and means connected with said raising and lowering means and with said movable means so as to be actuated by said raising and lowering means for shifting said movable means from one position to another.

14. In a towed plow or other ground working implement adapted to be connected with a tractor having steerable front wheel means and in which the implement is provided with a rear steerable wheel, the combination of means for raising and lowering said implement out of and into ground working position, a connection between said rear steerable wheel and said steerable front wheel means and including means movable from one position in which steering motion is transmitted from said steerable front wheel means to said rear steerable wheel to another position in which said rear wheel is held against steering movement when said steerable front wheel means is actuated, and means connected with said raising and lowering means and with said movable means so as to be actuated by said raising and lowering means for shifting said movable means into said one position when said implement is raised out of its ground working position so as to provide for steering the rear wheel of the implement by the steerable front wheel means of the tractor during transport.

15. A semi-integral implement adapted to be attached to a tractor having front steering wheel means, said implement comprising frame means, generally laterally swingable hitch means connecting the forward end of said frame means with the rear portion of the tractor, a steering connection between said rear wheel and said tractor front wheel means, said steering connection including a shaft supported on and shiftable generally laterally with said hitch means, arms on said shaft, and links extending from said arms to said tractor steerable front wheel means and said implement rear steerable wheel.

16. An integral implement adapted to be connected with a tractor having steerable front wheel means, comprising frame means, a rear steerable wheel, means connecting the latter with the rear portion of said frame means for both steering movement and movement vertically relative to said frame means, means acting between the tractor and the front portion of said frame means for raising and lowering the front portion of the latter, means for steering said rear wheel from the tractor steerable front wheel means when said frame means is raised, means connected with said raising and lowering means and said rear wheel for holding said rear wheel against steering movement when the front portion of said frame means is lowered, and means connected with said raising and lowering means and acting against said rear steerable wheel for raising and lowering the rear portion of said frame relative thereto whenever the front portion of said frame is raised and lowered by said raising and lowering means.

WALTER H. SILVER.
ROBERT E. COX.

References Cited in the file of this patent

UNITED STATES PATENTS

| Number | Name | Date |
|---|---|---|
| 1,637,811 | Ferguson | Aug. 2, 1927 |
| 1,702,615 | Paul | Feb. 19, 1929 |
| 1,837,347 | Vandine | Dec. 22, 1931 |
| 1,952,486 | Beall | Mar. 27, 1934 |
| 2,209,029 | Kriegbaum et al. | July 23, 1940 |
| 2,410,918 | Acton | Nov. 12, 1946 |
| 2,416,194 | Miller | Feb. 18, 1947 |